(12) United States Patent
Higuchi et al.

(10) Patent No.: US 7,408,977 B2
(45) Date of Patent: Aug. 5, 2008

(54) WIRELESS COMMUNICATIONS APPARATUS AND METHOD USING ARRAY ANTENNA

(75) Inventors: Kenichi Higuchi, Yokosuka (JP);
Hidekazu Taoka, Yokohama (JP);
Takashi Kataoka, Yokosuka (JP);
Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 681 days.

(21) Appl. No.: 10/931,996

(22) Filed: Sep. 2, 2004

(65) Prior Publication Data
US 2005/0053123 A1    Mar. 10, 2005

(30) Foreign Application Priority Data
Sep. 9, 2003    (JP)    ............... 2003-317465

(51) Int. Cl.
*H04B 1/00* (2006.01)
(52) U.S. Cl. ...................................... 375/148; 375/347
(58) Field of Classification Search ................. 375/148, 375/347, 349; 455/65
See application file for complete search history.

(56) References Cited

U.S. PATENT DOCUMENTS

| | | | | |
|---|---|---|---|---|
| 6,657,590 | B2 * | 12/2003 | Yoshida ...................... | 342/383 |
| 7,149,547 | B2 * | 12/2006 | Katz et al. ............... | 455/562.1 |
| 2001/0049295 | A1 * | 12/2001 | Matsuoka et al. ........... | 455/562 |
| 2002/0061051 | A1 * | 5/2002 | Kitahara ..................... | 375/144 |
| 2002/0082016 | A1 * | 6/2002 | Obayashi ................... | 455/436 |
| 2002/0123371 | A1 * | 9/2002 | Miyoshi et al. ............. | 455/562 |
| 2002/0126777 | A1 * | 9/2002 | Kasapi et al. ............... | 375/346 |
| 2003/0228887 | A1 * | 12/2003 | Kishigami et al. .......... | 455/561 |

FOREIGN PATENT DOCUMENTS

JP    2002-368663    * 12/2002

OTHER PUBLICATIONS

Shinya Tanaka, et. al., "Pilot Symbol-Assisted Decision-Directed Coherent Adaptive Array Diversity for DS-CDMA Mobile Radio Reverse Link", IEICE Trans. Fundamentals, vol. E80-A., Dec. 1997, pp. 2445-2454.
A. Harada, et. al., "Performance of Adaptive Antenna Array Diversity Transmitter for W-CDMA Forward Link", Proc. PIMRC99, Osaka, Japan, Sep. 1999, pp. 1134-1138.

* cited by examiner

*Primary Examiner*—David C. Payne
*Assistant Examiner*—Leon-Viet Q Nguyen
(74) *Attorney, Agent, or Firm*—Oblon, Spivak, McClelland, Maier & Neustadt, P.C.

(57) ABSTRACT

A wireless communication apparatus comprises an array antenna configured to receive a signal at multiple antenna elements; a DoA estimation unit configured to estimate directions of arrival of multiple paths contained in the received signal; an angle spread estimation unit configured to estimate an angle spread of the multiple paths; a first weighting calculation unit configured to estimate a common set of weighting factors for all the paths; a second weighting calculation unit configured to estimate an individual set of weighting factors for each of the multiple paths based on the estimated directions of arrival of the paths; a weighting unit configured to weight the received signal by multiplying the received signal by one of the common set of weighting factors or individual set of weighting factor; and a demodulator configured to demodulate the weighted signal.

12 Claims, 12 Drawing Sheets

WIRELESS COMMUNICATIONS APPARATUS AND METHOD USING ARRAY ANTENNA

BACKGROUND OF THE INVENTION

The present invention generally relates to a wireless communication technique, and more particularly, to a wireless communication apparatus and method using an array antenna.

An adaptive array antenna technique is often used in wireless communication systems. In an adaptive array antenna, multiple dipole antennas are arranged in an array, and the weighting of each of the antennas is controlled in an adaptive manner so as to produce the optimum directivity (or beam pattern) for communication with counterpart equipment. In other words, the antenna gain is increased in the direction of desired signals (in which the counterpart equipment is located), while the antenna gain is made small in directions other than the desired direction. This arrangement allows the desired signals to be received, while reducing interfering waves.

The conventional wireless communications systems with the adaptive array technique, such as a third generation mobile system based on Wideband Code Division Multiple Access (WCDMA), are mainly adapted for circuit switching communication, including speech communication. In the circuit switching communication, the number of communication channels and the data rate are the same in the uplink and the downlink (with a symmetric traffic characteristic), and transmission and reception on the communication channels are continuous. The weighting factor is estimated using the least mean square (LMS) algorithm or the recursive least square (RLS) algorithm so as to converge to the optimum value.

In the circuit switching communication, it can be assumed at high probability that the direction of incoming interfering waves (or the direction of the user who is transmitting the interfering waves) on uplink is consistent with the direction of the incoming interfering waves on downlink. Accordingly, the antenna directivity set in receiving signals, or appropriately calibrated directivity, can also be used when transmitting signals. This realizes efficient signal transmission, while reducing interference. By achieving appropriate directivity on both uplink and downlink, the subscriber capacity of the system can be increased. Such an adaptive array antenna technique is described in, for example, S. Tanaka, M. Sawahashi, and F. Adachi, "Pilot Symbol-assisted Decision-directed Coherent Adaptive Array Diversity for DS-CDMA Mobile Radio Reverse Link", IEICE Trans. Fundamentals, Vol. E80-A, pp. 2445-2454, December 1997, and A. Harada, S. Tanaka, M. Sawahashi, and F. Adachi, "Performance of Adaptive Antenna Array Diversity Transmitter for W-CDMA Forward Link", Proc. PIMRC99, pp. 1134-1138, Osaka, Japan, September 1999.

However, the wireless communication systems are currently shifting from circuit switching type to packet type, taking into account the compatibility with the Internet networks. In packet communication systems, burst transmission of communication channels is performed. Transmission and reception on the communication channels are discontinuous in response to the presence or the absence of data packets, instead of continuously transmitting or receiving on the communication channels. For this reason, the LMS algorithm or the RLS algorithm used in the conventional communication system to estimate the optimum weighting factors by taking sufficient time on the assumption of continuous arrival of communication channels cannot be applied to the burst transmission occurring in a short period of time.

In packet switching communications, the uplink traffic and the downlink traffic tend to be asymmetric. For example, when a mobile terminal downloads a large volume of data, a mere command is transmitted on the uplink. In contrast, the downlink traffic requires a large number of channels to transmit the requested data to the mobile terminal. Signal transmission may be carried out only on the downlink, while no signal transmission occurs on the uplink. In this case, producing a transmission beam pattern based on the beam pattern of the received signal does not work. In addition, the assumption that the directions of incoming interfering waves are almost the same on uplink and downlink is not appropriate any longer, because of the asymmetric traffic characteristic and difference in frequencies used. Accordingly, it becomes difficult to reduce interfering waves and realize appropriate beam patterns on uplink and downlink (especially, on downlink).

To estimate weighting factors in the current and future wireless communication systems in which asymmetric traffic is expected, multipath fading occurring along with increased transmission rate and widened frequeuncy band, must to be taken into account. As the sampling frequency increases, multipath components, which are not captured in the conventional wireless communication systems, are detected as interfering waves. In this case, M weighting factors are estimated for each of L paths contained in the received signal, and L signal components received at the respective paths are combined for demodulation of the received signal, as disclosed in the above-described publications, where M is the number of antenna elements of the array antenna and L is the number of paths. Since each path is identified with this technique, the receiving performance is improved. This technique is preferable from the viewpoint of accuracy of the demodulated data.

However, because the received signal power obtained from each path is relatively small, the weighting error (which is the offset of the produced beam pattern from the optimum beam pattern due to thermal noise or other factors) becomes large.

Another known technique is to estimate M weighting factors using a composite signal of all the paths, without identifying each of the paths contained in the received signal. Since the combined signal has relatively large power, the weighting error becomes small. However, when the arriving direction varies among the paths greatly, namely, when the angle spread is large, then the receiving performance is degraded because the multiple paths are not distinguished. Because of multipath fading, interfering waves cannot be reduced sufficiently, and a satisfactory beam pattern cannot be produced.

SUMMARY OF THE INVENTION

The present invention is conceived to overcome the above-described problems, and it is an object of the present invention to provide a wireless communication technique for allowing an array antenna to produce a beam pattern with satisfactorily reduced interfering waves even in the asymmetric-traffic wireless communication environment.

To achieve the objects, in one aspect of the invention, a wireless communication apparatus comprises:

(a) an array antenna configured to receive a signal at a plurality of antenna elements;

(b) a DoA estimation unit configured to estimate directions of arrival of multiple paths contained in the received signal;

(c) an angle spread estimation unit configured to estimate an angle spread of the multiple paths;

(d) a first weighting calculation unit configured to estimate a common set of weighting factors in common for all the paths;

(e) a second weighting calculation unit configured to estimate an individual set of weighting factors for each of the multiple paths based on the estimated directions of arrival of the paths;

(f) a weighting unit configured to weight the received signal by multiplying the received signal by either the common set of weighting factors or the individual set of weighting factor; and (g) a demodulator configured to demodulate the weighted signal.

With this arrangement, weighting factors are calculated, while estimating the directions of arrival of multiple paths. Consequently, an appropriate set of weighting factors can be calculated promptly, without using an algorithm (such as LMS) taking a long time for convergence.

In a preferred example, the wireless communication apparatus further comprises a determination unit configured to determine whether the estimated angle spread exceeds a threshold. In this case, the weighting unit selects one of the common set of weighting factors and the individual set of weighting factors, based on the determination result.

In a preferred example, the array antenna produces a beam pattern with a main lobe toward an averaged direction of the multiple paths based on the common set of weighting factors calculated by the first weighting estimation unit when the angle spread resides within a prescribed range.

With this arrangement, an appropriate beam pattern can be produced in response to the estimated angle spread.

Preferably, the DoA estimation unit identifies the source of the received signal. By identifying the source of the incoming waves during the estimation of the DoA and the calculation of the weighting factor set, a signal can be transmitted to a desired destination making use of the weighting factor set, while preventing interfering waves.

In a preferred example, the wireless communication apparatus further includes a third weighing calculation unit that calculates a set of transmit weighting factors so as to realize a beam pattern with a main lobe toward a single path selected from the multiple paths, a beam pattern with a main lobe toward each of the multiple paths, or a beam pattern with a main lobe toward an averaged direction of arrival of the multiple paths, based on the estimation results of the DoA estimation unit and the angle spread estimation unit.

With this arrangement, an appropriate set of transmit weighting factors is calculated so as to realize a desired beam pattern in accordance with the estimation results. Consequently, the optimum beam pattern for transmitting a signal can be produced according to the wireless communication environment or the channel conditions.

In another aspect of the invention, a wireless communication method is provided. The method comprises the steps of:

(a) receiving a signal at multiple antenna elements;

(b) estimating directions of arrival of multiple paths contained in the received signal;

(c) estimating angle spread of the multiple paths;

(d) determining whether the estimated angle spread exceeds a threshold;

(e) weighting the received signal using one of a common set of weighting factors in common for all the paths and an individual set of weighting factors calculated for each of the paths, based on the determination result; and (f) demodulating the weighted signal.

BRIEF DESCRIPTION OF THE DRAWINGS

Other objects, features, and advantages of the. invention will become more apparent from the following detailed description when read in conjunction with the accompanying drawings, in which.

DETAILED DESCRIPTION OF THE PREFERRED EMBODIMENT

The present invention is described in detail below in conjunction with the attached drawings.

Figure 1:
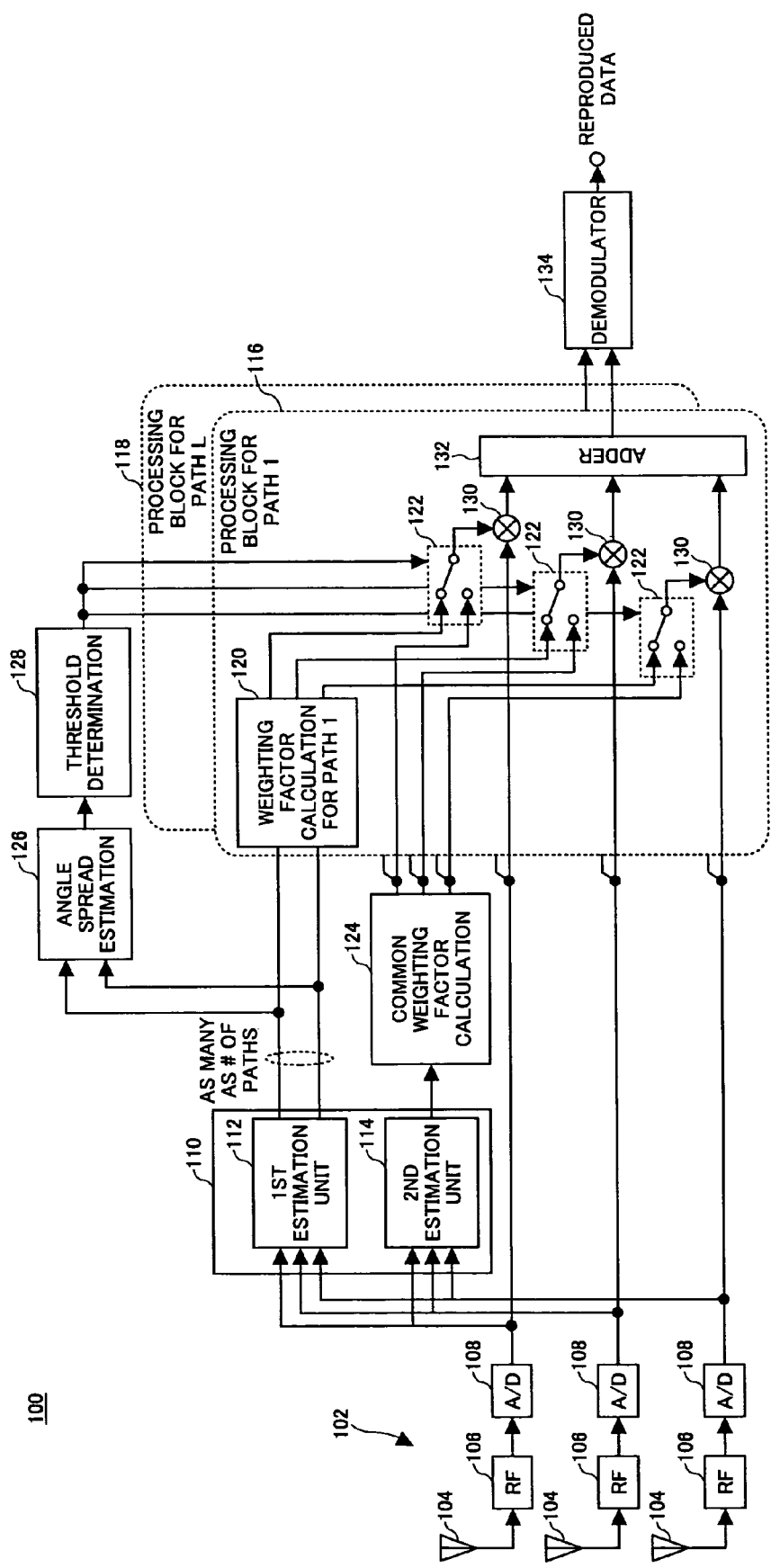
FIG. 1 is a functional block diagram of a wireless receiver according to the first embodiment of the invention.

FIG. 1 is a functional block diagram of the main part of a wireless receiver 100 according to the first embodiment of the invention. The wireless receiver 100 has an array antenna 102 with multiple antenna elements 104. In the drawing, only three antenna elements 104 are depicted for the sake of simplification; however, any suitable number of antenna elements can be employed. The antenna elements 104 are, for example, dipole antennas arranged in a line, an arc, or any suitable shape with an interval of half wavelengths, for example, between them. The size, the interval, and the shape of each of the antenna elements 104 are determined so as to realize an appropriate directivity (or beam pattern), and therefore, these factors are not limited to this example. Front end units 106 are connected to the respective antenna elements 104 to perform frequency conversion, bandwidth limitation, power amplification, and other front-end operations. The outputs of the front end units 106 are connected to the inputs of the associated analog-to-digital converters 108. The digital outputs of the analog-to-digital converters 108 are supplied to direction-of-arrival (DoA) estimator 110 and other components pertinent to the present invention, which are described below. The DoA estimator 110 and other pertinent components may be realized as hardware, software, or combination thereof.

The DoA estimator 110 estimates the directions of arrival of multipath components contained in the received signal. The DoA estimator 110 includes a first estimation unit 112 for estimating the direction of arrival of each of the multiple paths, and a second estimation unit 114 for estimating a common direction of arrival among all the paths.

The wireless receiver 100 has L processing blocks corresponding to L paths contained in the received signal. In FIG. 1, only the first processing block 116 and the L-th processing block 118 are illustrated for the sake of simplification. The value of L is determined appropriately in accordance with the actual use. The first processing block 116 includes a weighting factor calculation unit 120 for the first path, which receives the estimated directions of arrival of the multiple paths from the first estimation unit 112. The weighting factor calculation unit 120 calculates a set of weighting factors (for example, M weighting factors) for the signal having arrived through path 1. M is the number of antenna elements 104. The outputs of the weighting factor calculation unit 120 are supplied to M switches 122 provided corresponding to the M antenna elements 104. Each of the M weighting factors is connected to one of the input terminal of the associated switch 122. The other input terminals of each switch 122 receives a common weighting factor output from a common weighting factor calculation unit 124 and used in common for all the paths. The common weighting factor calculation unit 124 outputs a set of weighting factors (e.g., M weighting factors), which are used in common among all the paths so as to set the directivity of the array antenna toward an averaged direction with respect to all the paths.

The wireless receiver 100 also includes an angle spread estimation unit 126, which receives the outputs of the first estimation unit 112 of the DoA estimator 110. The angle spread estimation unit 126 estimates an angle spread defined by the directions of arrival of the multiple paths contained in the received signal. The estimation result of the angle spread is supplied to a threshold determination unit 128, which determines whether the estimated angle spread exceeds a prescribed threshold value and outputs a control signal according to the determination result. The output control signal is connected to the control terminal of each of the switches 122.

Each of the switches 122 selects either the individual weighting factor estimated for the individual path or the common weighting factor, in response to the contents of the control signal, and supplies the selected one to the associated multiplier 130 provided for each of the antenna elements 104. The multiplier 130 performs complex multiplication on the received signal by the selected weighting factor, and outputs the calculation result to the adder 132. The adder 132 combines the signals received at the respective antenna elements 104 and appropriately weighted by the associated multipliers 130. The combined signal for path 1 is supplied to the demodulator 134. The demodulator 134 also receives the combined signals for paths 2-L from the associated processing blocks, which have the same structure as the processing block 116 for path 1. The demodulator 134 demodulates the received signal using, for example, rake combining. In FIG. 1, the common weighting factor set is supplied to each of the L processing blocks arranged in parallel. However, the wireless receiver 100 may be structured such that, when using the common weighting factor set, the received signal is weighted using the common weighting factor set only in the first processing block 116. In this case, the received signal weighted by the common weighting factor set is supplied only from the first processing block 116 to the demodulator 134.

Figure 2:
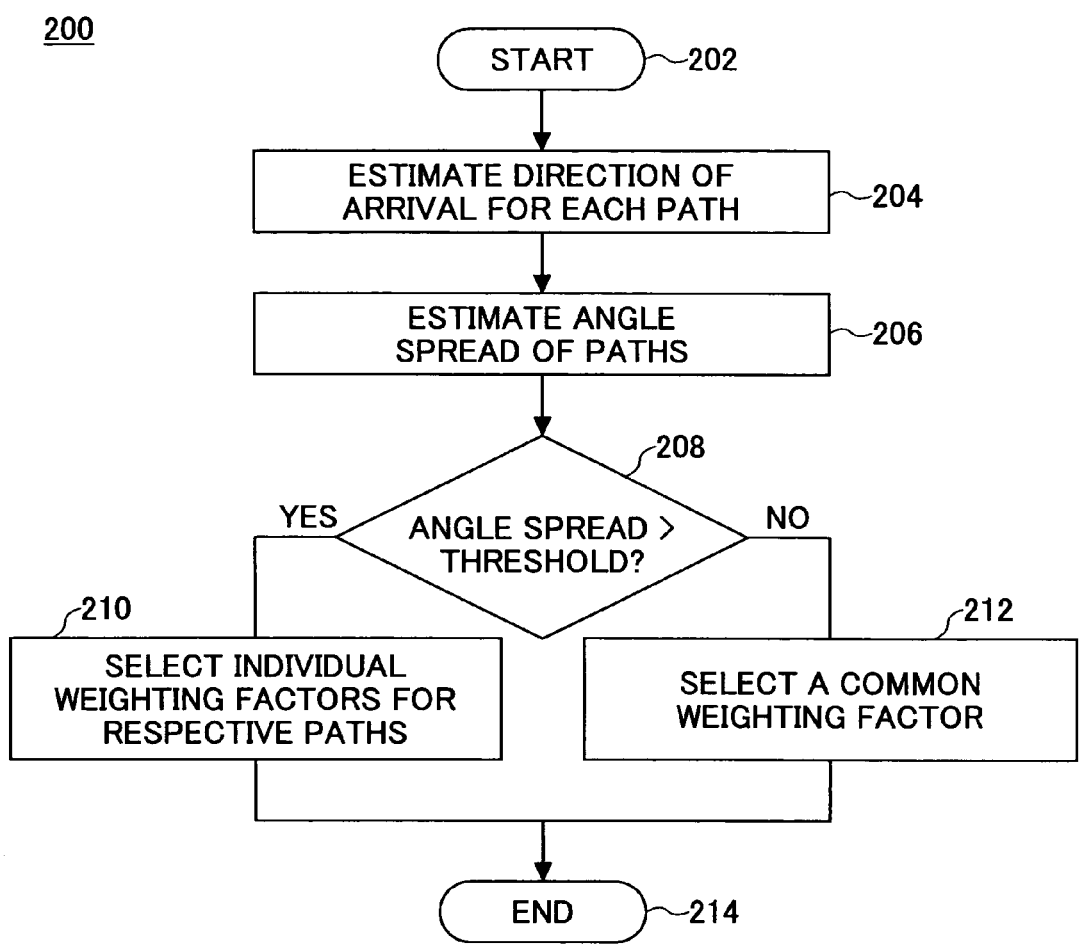
FIG. 2 is a flowchart of the operations carried out by the wireless receiver shown in FIG. 1.

FIG. 2 is a flowchart of the major operations of the wireless receiver 100. The process starts in step S202. A signal is received at multiple antenna elements 104, and processed at the receiver front end units 106 and analog-to-digital converters 108. The digital signals are supplied from the analog-to-digital converters 108 to the DoA estimator 110, and the process proceeds to step S204.

In Step S204, the directions of arrival of the multiple paths contained in the received signal are estimated. This step is performed in common in the first and second estimation units 112 and 114 of the DoA estimator 110.

Figure 3:
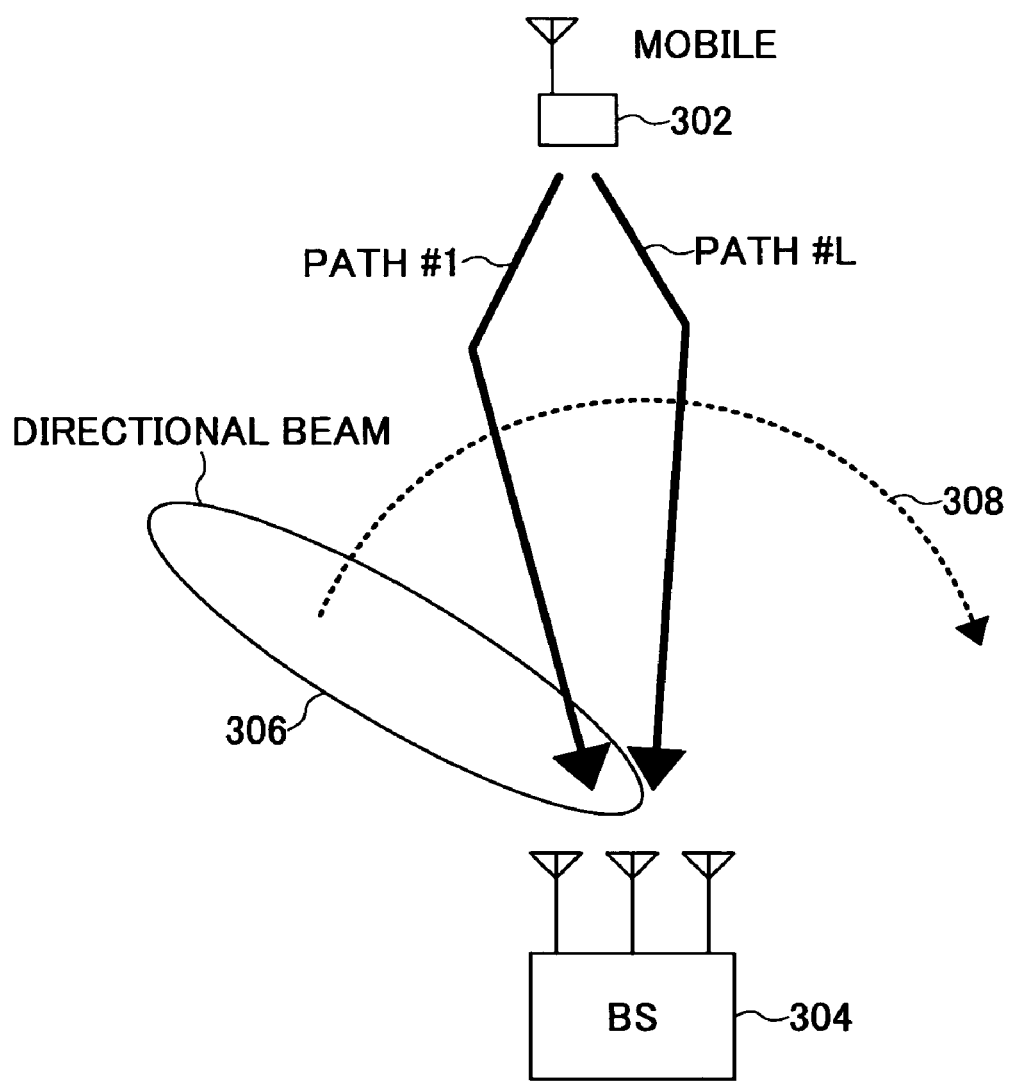
FIG. 3 is a schematic diagram illustrating measurement of the arriving directions of the paths.

FIG. 3 is a schematic diagram illustrating estimation of the direction of arrival for each path. In this example, the wireless base station (BS) 304 receives a signal from a mobile terminal 302, and estimates the directions of arrival of the multiple paths contained in the signal from the mobile terminal 302. The signal transmitted by the mobile terminal 302 is subjected to the influence of multipath fading on an uplink, and arrives at the base station 304 through L paths. Although in FIG. 3 only the first-arrived path (path #1) and the $L^{th}$-arrived path (path #L) are depicted, there are L paths indeed. The DoA estimator 110 sweeps a beam pattern 306 along the arrow 308 over the entire area of the cell or the sector, and measures the power of the incoming waves. The beam pattern 306 has such a narrow directivity that the respective paths can be distinguished from each other. For simplification, the beam pattern 308 is swept over the sector with 120-degree geometry in this drawing.

Figure 4:
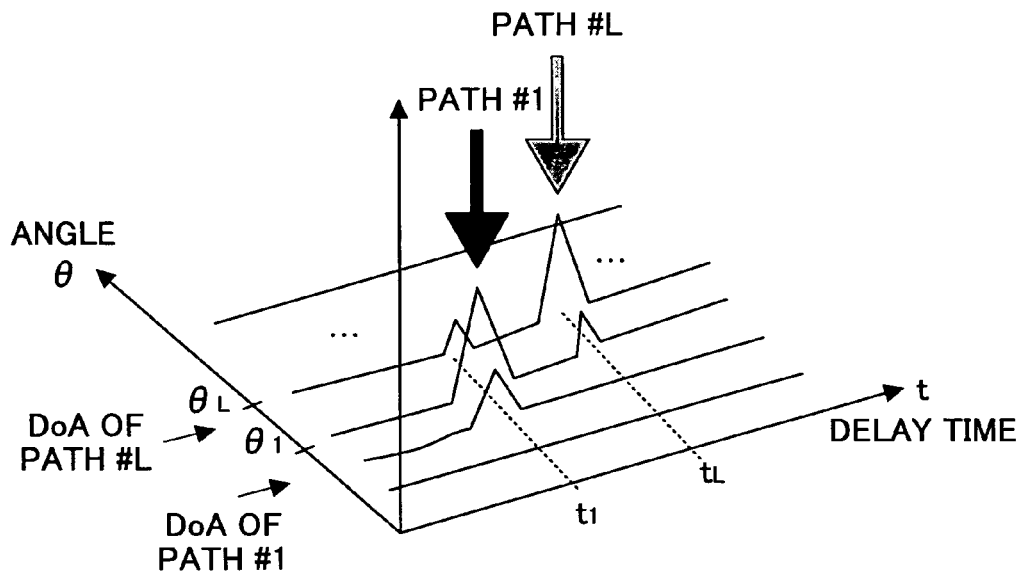
FIG. 4 is a schematic diagram illustrating the power profiles with respect to delay time and path arriving direction.

FIG. 4 is a schematic diagram of the power profile acquired from the beam sweep. The power profile $P(\theta, t)$ is detected as a function of the direction of arrival ($\theta$) and delay time (t). The direction of arrival can be estimated using a known technique, such as beamformer, Capon's beamformer, or the MUSIC (multiple signal classification) algorithm.

The first estimation unit 112 estimates individual directions of arrival of the respective paths by sweeping the beam pattern at receiving timings t1, t2, ..., tL for the first through L-th paths and by selecting the angle $\theta i$ exhibiting the maximum receiving power $P(\theta, t=ti)$, where i=1, 2, ..., L. The second estimation unit 114 estimates a common direction of arrival among all the paths by estimating the power summations P1, P2, ..., PL at the respective paths throughout the receiving timings t1, t2, ..., tL and by selecting the direction exhibiting the maximum power sum as the direction of arrival in common among the paths. The total power (or power summation) Pi of the i-th path is expressed as $$Pi = P(\theta i, t1) + P(\theta i, t2) + \ldots, P(\theta i, tL)$$

where i=1, 2, ..., L.

Alternatively, an averaged direction $\theta$ave may be computed from the power summations P1, P2, ..., PL based on equation (1), and it may be used as the common direction of arrival for all the paths.

$$\theta_{avg} = \frac{\sum_{l=1}^{L} P_l \theta_l}{\sum_{l=1}^{L} P_l} \tag{1}$$

It should be noted that, in the embodiment, explanation is made using only the angle of horizontal direction (azimuth) for the sake of simplification. However, the ascending vertical angle (elevation angle) may also be considered for more general applications. When the direction of arrival of each path is estimated, the process proceeds to step S206.

Figure 5:
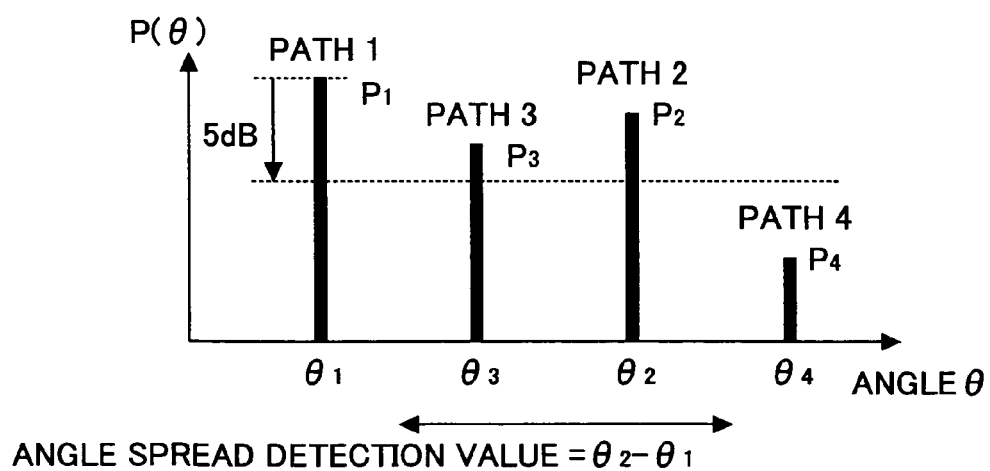
FIG. 5 schematically illustrates the power profile used to estimate angle spread.

In step S206, the angle spread of the multiple paths is estimated. The angle spread is defined as the maximum angle between directions of arrival. The angle spread is estimated using, for example, a power profile illustrated in FIG. 5. In the example shown in FIG. 5, the angle spread is determined as the difference between the maximum angle and the minimum angle of the paths satisfying a prescribed condition. For example, among those paths having receiving powers that reside within a prescribed range from the maximum power, the maximum angle (direction) of arrival and the minimum angle (direction) of arrival are selected to estimate the angle spread. In FIG. 5, paths 1, 2, and 3 with the receiving power P1, P2 and P3 residing within 5 dB of the maximum power P1 are selected, and the difference θ2-θ1 between the maximum angle θ2 and θ1 is obtained as the angle spread.

Alternatively, the three-dimensional power profile illustrated in FIG. 4 may be used to estimate the angle spread. In this case, the standard deviation (σ) or variance of the directions of arrival is computed using equation (2), and the computed value may be used as the angle spread.

$$\sigma = \sqrt{\frac{\sum_{l=1}^{L}(\theta_l - \theta_{avg})^2 P_l}{\sum_{l=1}^{L} P_l}}, \; \theta_{avg} = \left(\sum_{l=1}^{L} P_l \theta_l\right) \bigg/ \left(\sum_{l=1}^{L} P_l\right) \quad (2)$$

where θ1, θ2, ..., θL are the directions of arrival of the respective paths, and P1, P2, ..., PL are the power summations of the respective paths throughout the receiving timings t1, t2, ..., tL. Upon estimation of the angle spread, the process proceeds to step S208.

In step S208, it is determined by the threshold determination unit 128 whether the estimated angle spread exceeds a prescribed value. The threshold value (or the prescribed value) is determined in advance by experiment or simulation. If the estimated angle spread is greater than the threshold value (YES in S208), the process proceeds to step S210.

Figure 6:
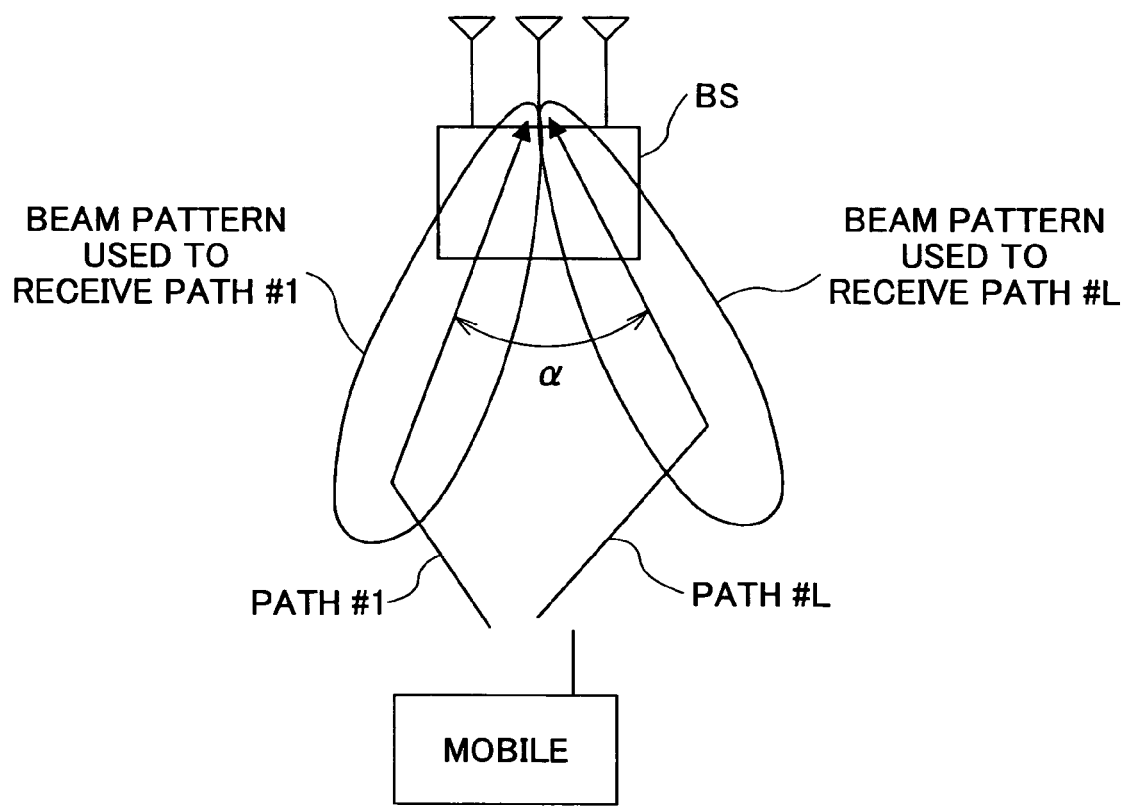
FIG. 6 schematically illustrates beam patterns produced by the weighting factor calculated for the respective paths.

In step S210, a control signal is generated and supplied to the switches 122 so as to select the outputs of the weighting factor calculation unit 120, which outputs provide the weighting factors for the individual paths. In this case, the selected weighting factors are used to define a beam pattern with main lobes toward the individual paths spreading across angle α, as illustrated in FIG. 6. In the example shown in FIG. 6, only path 1 and path L are depicted, together with the main lobes pointing along these two paths, for simplification. However, it is obvious that the bam patterns covering three or more directions of arrival can be produced.

Figure 7:
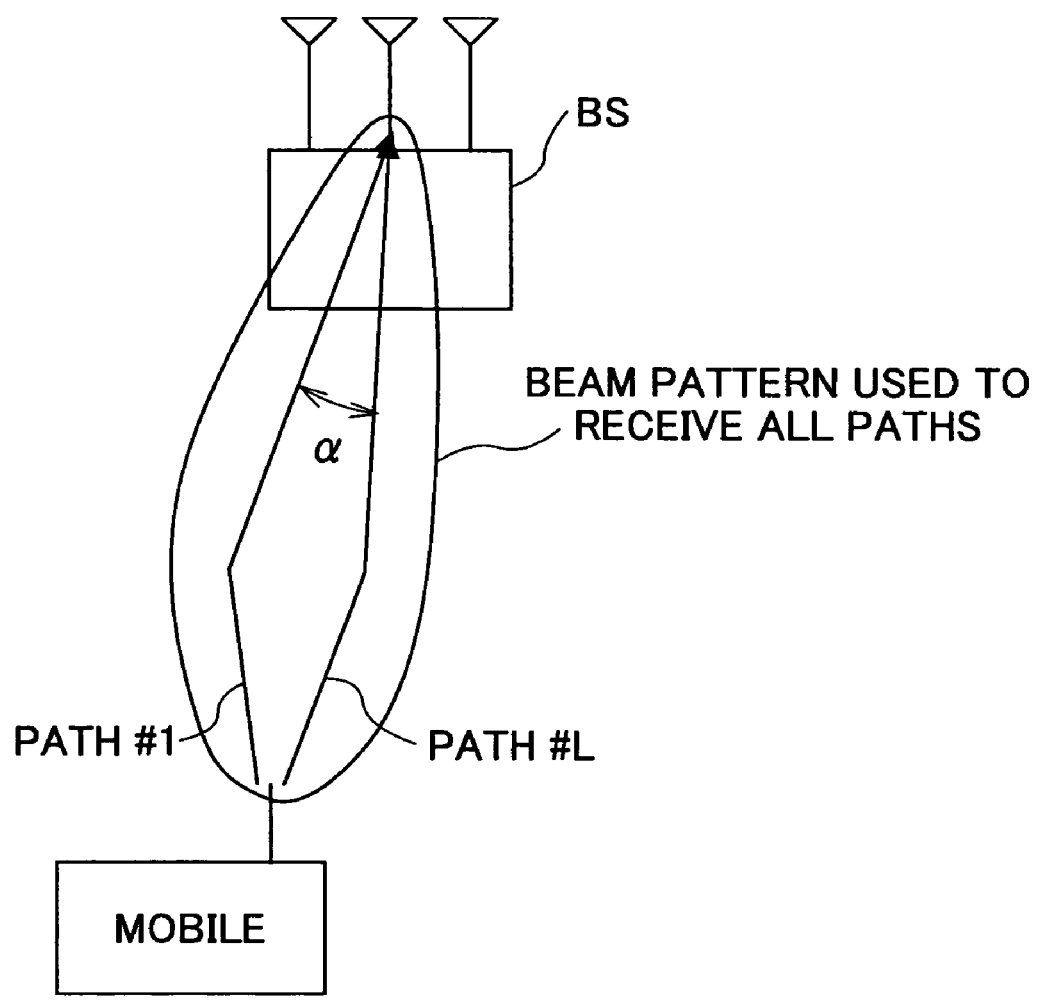
FIG. 7 schematically illustrates a beam pattern produced by a set of weighting factors applied in common to all the paths.

On the other hand, if the estimated angle spread does not exceed the threshold (NO in S208), the process proceeds to step S212. In this case, a control signal is generated and supplied to the respective switches 122 so as to select the common weighting factor set (consisting of M weighting factors). In this case, a beam pattern with the main lobe pointing toward the averaged direction of arrival is realized, as illustrated in FIG. 7.

The set of weighting factors selected in step S212 are generated by the common weighting factor calculation unit 124 using, for example, equation (3).

$$w = \frac{1}{\sqrt{M}} \begin{bmatrix} 1 \\ \exp\{j2\pi d \sin\theta / \lambda_U\} \\ \vdots \\ \exp\{j2\pi d(M-1)\sin\theta / \lambda_U\} \end{bmatrix} \quad (3)$$

where w is the weighting vector of a set of M entries, M is the number of antenna elements, θ is a selected (or averaged) direction of arrival, d is a distance between adjacent antenna elements, and λu is the wavelength of the carrier frequency. The set of weighting factors realizes the beam pattern having the directivity toward the azimuth θ.

The individual set of weighting factors selected for each path in step S210 can also be calculated by the associated calculation unit 120 using equation (3). Of course, calculation of the common and/or individual set of weighting factors is not limited to equation (3), but any suitable method can be used.

When a suitable set of weighting factors is selected (either in step S210 or S212), the process relating to determination of weighting factor set terminates in step S214, and the subsequent signal processing required for the received signal is performed. The signal received at each of the antenna elements 104 is multiplied by the associated weighting factor of the selected set at one of the multipliers 130. The weighted received signals are combined at the adder 132, and demodulated by the demodulator 134.

According to the first embodiment, a set of weighting factors is calculated, while estimating the directions of arrival of the radio waves. Consequently, an appropriate beam pattern is produced promptly, without using an algorithm (such as LMS) taking a long convergence time.

Because the weighting factor estimation scheme is selected appropriately depending on the angle spread of the incoming waves, the optimum beam pattern can be produced regardless of the degree of the spread angle. When the angle spread is large, an individual set of weighting factors calculated for each path is used, thereby preventing degradation of the receiving performance. If the angle spread is small, a common set of weighting factors is calculated based on the combined signal of all the paths, thereby improving the estimation accuracy of the weighting factors. In this manner, the optimum beam pattern is created regardless of the angle spread, and at the same time, both the estimation accuracy of the weighting factors and the receiving performance can be guaranteed.

Figure 8:
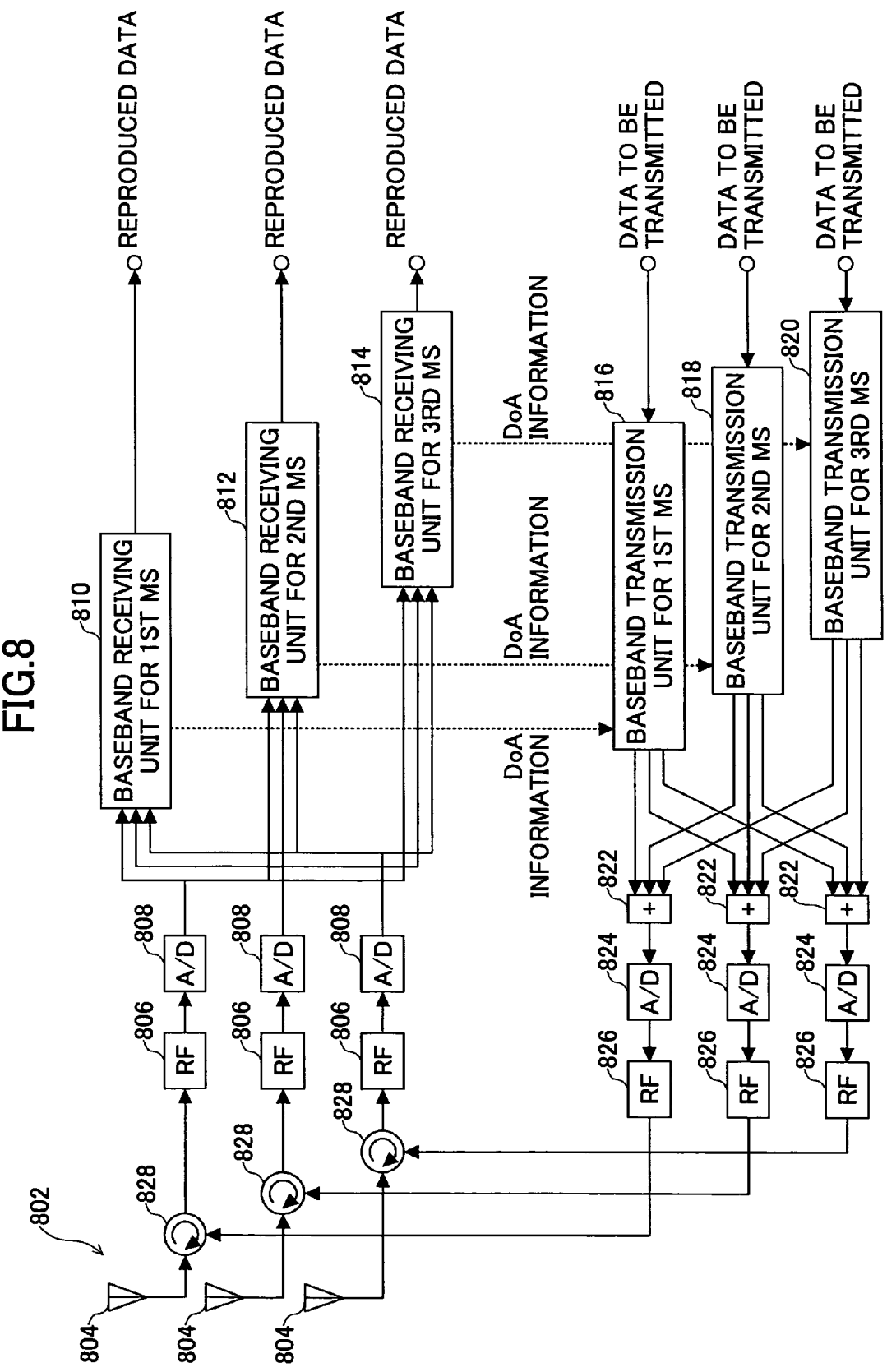
FIG. 8 is a functional block diagram of the main part of the wireless communication apparatus according to the second embodiment of the invention.

FIG. 8 is a functional block diagram of a wireless communication apparatus according to the second embodiment of the invention. The wireless communication apparatus has an array antenna 802 with multiple antenna elements 804. In the drawing, only three antenna elements 804 are depicted for the sake of simplification; however, any suitable number of antenna elements can be employed. The size, the interval, and the shape of each of the antenna elements 804 of the array antenna 802 are determined so as to realize an appropriate directivity (or beam pattern). Receiving front end units 806 are connected to the respective antenna elements 804 to perform frequency conversion, bandwidth limitation, power amplification, and other front-end operations for the received signal. The outputs of the receiving front end units 806 are connected to the inputs to the associated analog-to-digital converters 808. The digital outputs of the analog-to-digital converters 808 are supplied to each of baseband receiving units 810, 812, and 814. Each of the baseband receiving units 810, 812, and 814 implements signal processing to be performed after analog-to-digital conversion, and more particularly, the operations performed by components 110 through 134 illustrated in FIG. 1. The baseband receiving units 810, 812 and 814 output reproduced (or demodulated) data for the first, second and third mobile terminals (MS), respectively. In this arrangement, the baseband processing is performed for each of the signals received from the first through third mobile terminals, distinguishing the sources of the incoming waves. Although in FIG. 8 the wireless communication apparatus is depicted so as to deal with only three mobile terminals for the sake of simplification, any number of mobile terminals can be handled by the wireless communication apparatus. In addition, the number of antenna elements does not have to be consistent with the number of mobile terminals.

The wireless communication apparatus also includes baseband transmission units 816, 818 and 820, which perform baseband signal processing on data to be transmitted to the first, second and third mobile terminals, respectively. The outputs of the baseband transmission units 816, 818 and 820 are combined at each of the adders 822, which are provided corresponding to the antenna elements 804. The outputs of the adders 822 are supplied to the associated analog-to-digital converters 824. Transmit front-end units 826 are provided corresponding to the antenna elements so as to perform necessary signal processing, including frequency conversion, bandwidth limitation and power amplification on the digitalized data to be transmitted. The outputs of transmit front-end units 826 are connected to the associated antenna elements 804 via the circulators 828, and transmitted from the antenna elements 804.

Figure 9:
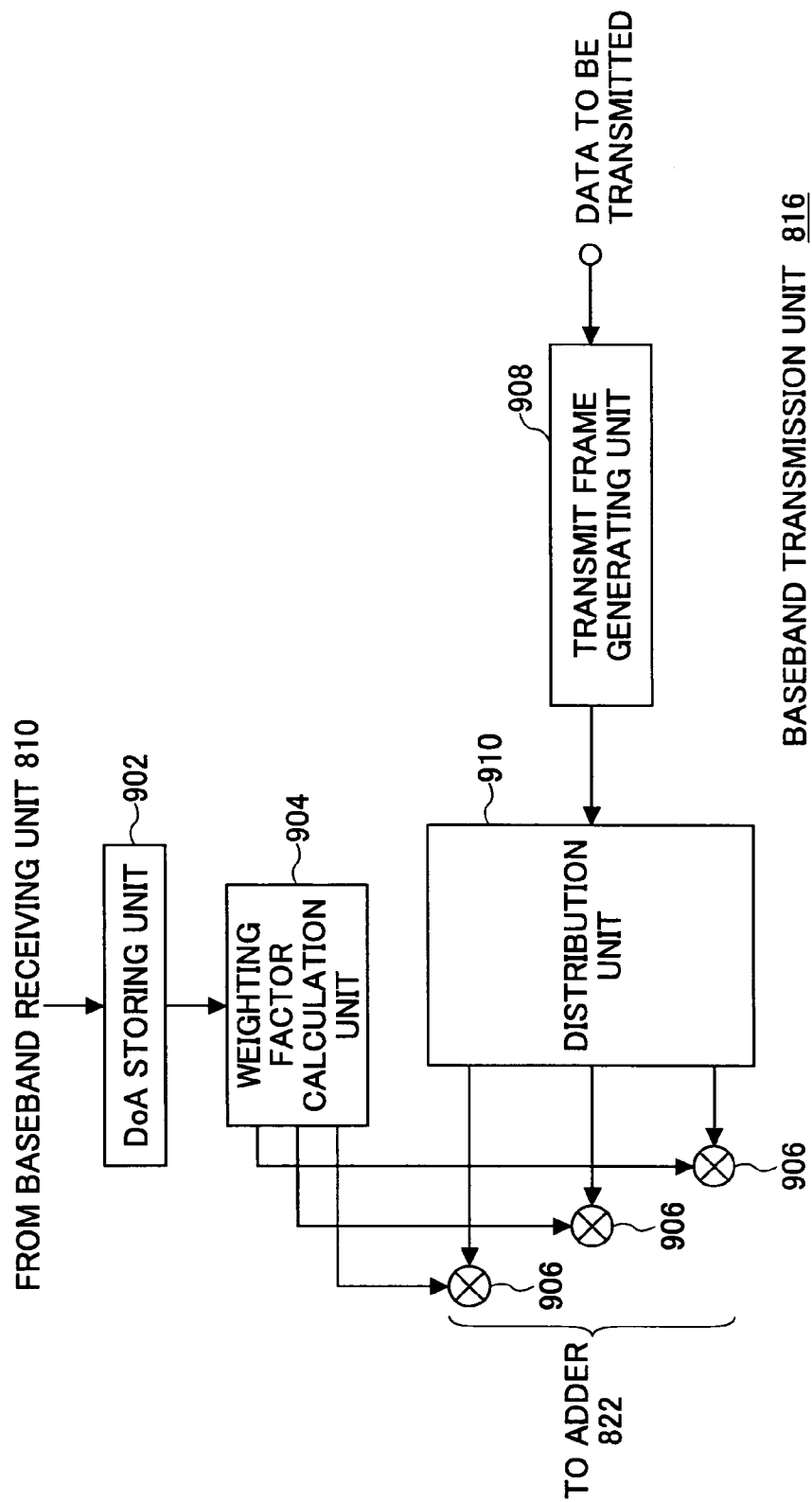
FIG. 9 is a functional block diagram of the baseband transmission unit used in the wireless communication apparatus shown in FIG. 8.

FIG. 9 is a functional block diagram illustrating an example of the baseband transmission unit 816 shown in FIG. 8. The baseband transmission units 818 and 820 have the same structure. The baseband transmission unit 816 has a DoA (direction-of-arrival) storing unit 902, which stores information about the angle spread and the directions of arrival of the multiple paths contained in the received signal estimated by the baseband receiving unit 810. To be more precise, the information obtained by the DoA estimator 110, the angle spread estimation unit 126 and the threshold determination unit 128, which are included in the baseband receiving unit 810 for the first mobile terminal (MS), are stored as the DoA information of the first mobile terminal in the DoA storing unit 902.

The baseband transmission unit 816 also includes a weighting factor calculation unit 904, a distribution unit 910, and a transmit frame generating unit 908. The weighting factor calculation unit 902 calculates a set of weighting factors (for example, M weighting factors, where M is the number of antenna elements 804) used to transmit the data. Each of the M weighting factors is connected to one of the input terminals of the multiplier 906, which is provided corresponding to one of the antenna elements 804. The transmit frame generating unit 908 converts the frame structure of the data to be transmitted to the first mobile terminal so as to produce appropriate wireless packets. The wireless packets are distributed by the distribution unit 910 according to the number of antenna elements 804, and each portion of the distributed packets is supplied to the other input terminal of the associated multiplier 906. The outputs of the multipliers 906 are supplied to the associated adders 822 (see FIG. 8).

Figure 10:
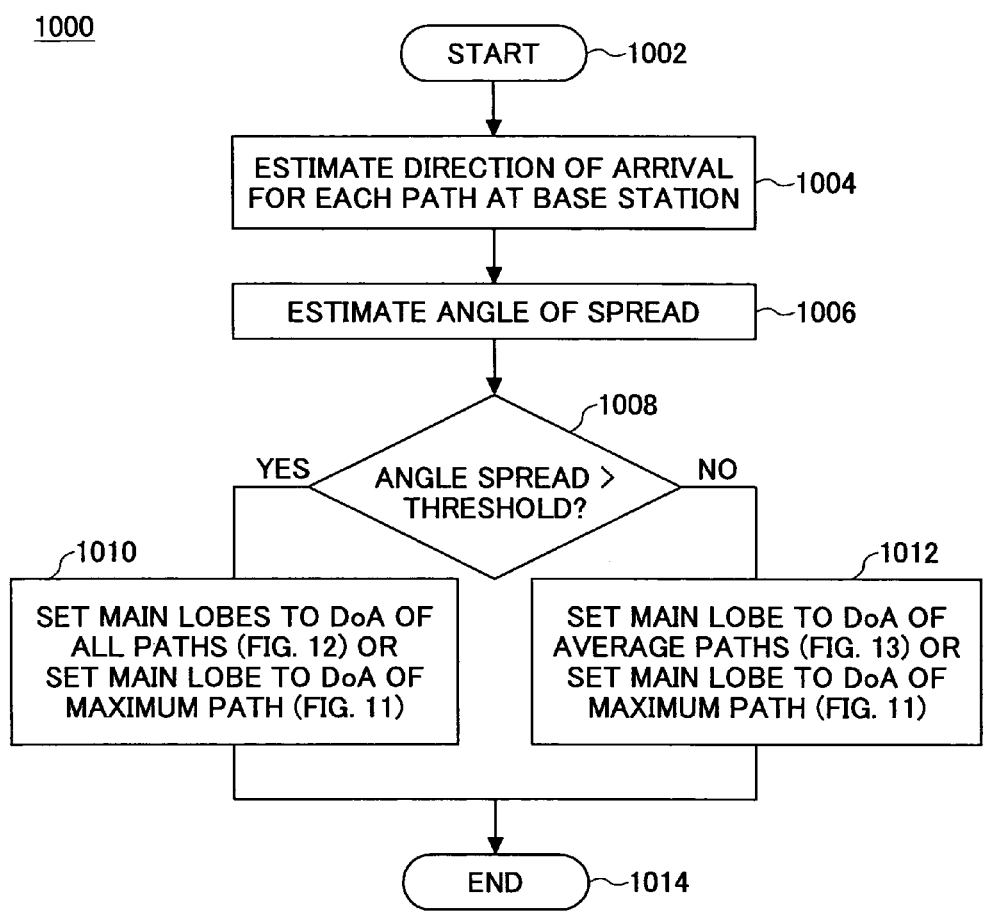
FIG. 10 is a flowchart of the operations carried out by the wireless communication apparatus shown in FIG. 8.

FIG. 10 is a flowchart of the operations carried out by the wireless communication apparatus 800 according to the second embodiment of the invention. The wireless communication apparatus 800 is a wireless base station in this example, which communicates with mobile terminals 1, 2, and 3, as described above. The flow starts in step S1002 when signals are received at the antenna elements 804, and subjected to appropriate signal processing at the receiving front-end units 806 and analog-to-digital converters 808. The outputs of the analog-to-digital converters 808 are supplied to each of the baseband receiving units 810, 812, and 814. Then, the process proceeds to step S1004.

In step S1004, the directions of arrival of multiple paths contained in the received signal are estimated, as in step S204 shown in FIG. 2. Then, in step S1006, the angle spread of the detected paths is estimated, as in step S206 of the first embodiment. In step S1008, it is determined by the determination unit of the baseband receiving unit 810 whether the estimated angle spread exceeds the threshold value, as in step S208 of the first embodiment.

The directions of arrival of the paths, the angle spread, and the determination result obtained in steps S1004, S1006 and S1008 are stored as the DoA information in the DoA storing units 902 of the baseband transmitting units 816, 818, and 820.

Figure 11:
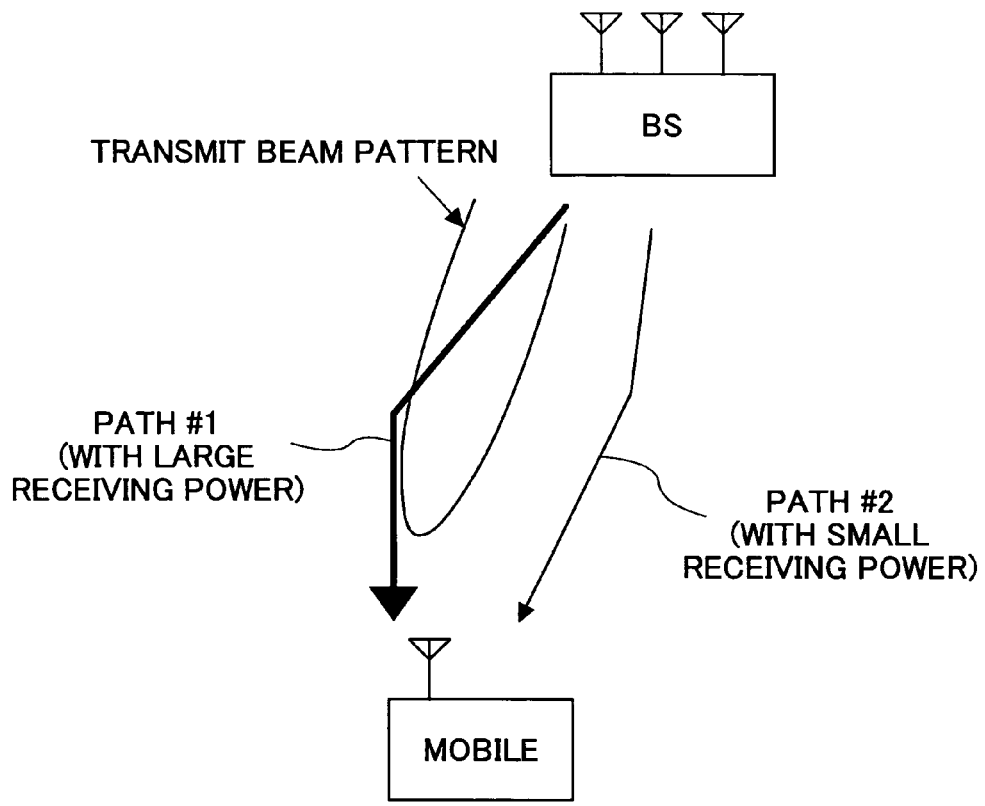
FIG. 11 schematically illustrates a transmission beam pattern produced by the wireless communication apparatus so as to be directed to the direction of arrival of the maximum path according to the second embodiment of the invention.
Figure 12:
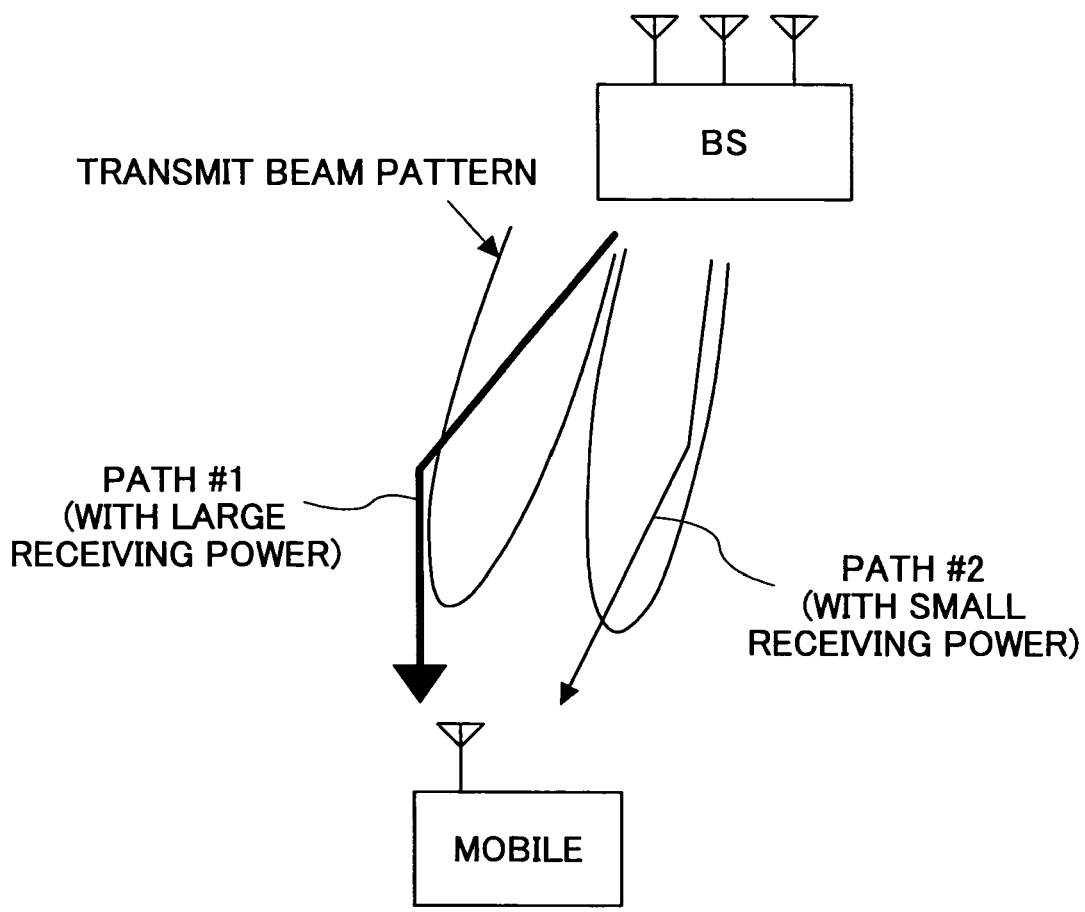
FIG. 12 schematically illustrates a transmission beam pattern produced by the wireless communication apparatus so as to be directed to the directions of arrival of all the paths under a prescribed condition according to the second embodiment of the invention.

If the angle spread is greater than the threshold value (YES in S1008), the process proceeds to step S1010. In step S1010, appropriate weighting factors are calculated by the weighting factor calculation unit 904 based on the stored DoA information, so as to produce either a beam pattern with the main lobe toward the maximum path (as shown in FIG. 11) or a beam pattern with the main lobes toward the individual paths (as shown in FIG. 12). If the angle spread does not exceed the threshold value (NO in S1008), the process proceeds to step S1012, in which weighting factors are calculated by the weighting factor calculation unit 904 based on the stored DoA information, so as to produce a beam pattern with the main lobe toward the maximum path (as shown in FIG. 11) or a beam pattern with the main lobe toward the averaged direction of arrival of all the paths (as shown in FIG. 13).

FIG. 11 illustrates a beam pattern produced using a set of weighting factors calculated such that the main lobe is toward $\theta 1$ of path #1 with the maximum receiving power. The weighting factor vector w for direction $\theta 1$ is expressed by equation (3), using the parameters of the number (M) of antenna elements, the distance (d) between adjacent antenna elements, and the wavelength ($\lambda D$) of the downlink carrier.

FIG. 12 illustrates a beam pattern produced using weighting factors calculated such that the main lobes point in the directions $\theta 1, \theta 2, \ldots, \theta L$ of the respective paths. The weighting factor set realizing this beam pattern is effective when the angle spread is large.

Figure 13:
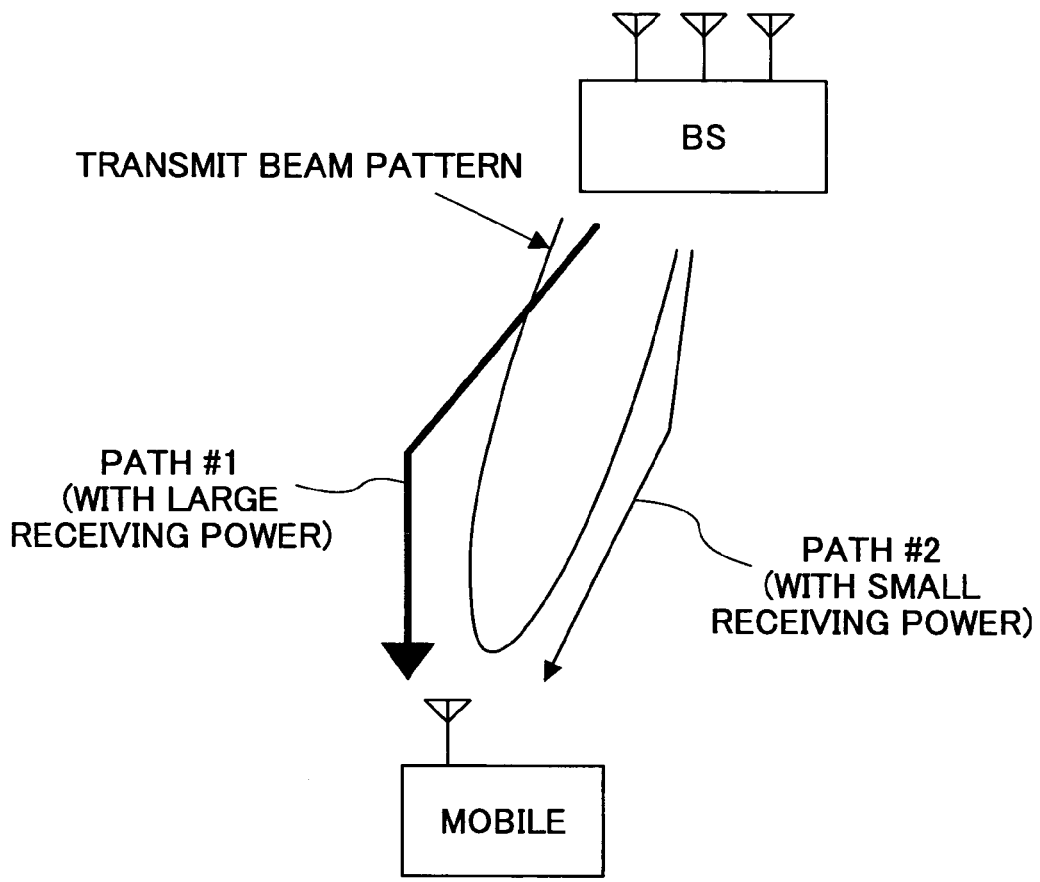
FIG. 13 schematically illustrates a transmission beam pattern produced by the wireless communication apparatus so as to be directed to the average direction of arrival of all the paths under a prescribed condition according to the second embodiment of the invention.

FIG. 13 illustrates a beam pattern produced using weighting factors calculated such that the main lobe is toward the averaged direction $\theta ave$ of arrival of all the paths. The weighting factor set realizing this beam pattern is efficient when the angle spread is small.

The weighting coefficient set realizing the beam pattern shown in FIG. 11 is efficiently applicable not only to the case of large angle spread, but also to the case of small angle spread. This is because, depending on the radio communication environment, it may be better to concentrate the transmitted signals toward a certain direction, rather than dispersing the signals to all the paths, even under the large angle spread. Which beam pattern (shown in FIG. 11 or the alternative) should be used in steps S1010 and S1012 is determined taking into account, for example, the delay time of the power profile, in addition to the range of the angle spread. For example, if the angle spread is large and if the delay time of each path is short in step S1010, then the weighting factor set for realizing the beam pattern shown in FIG. 12 is selected. If the delay time of each path is long under the large angle spread in step S1010, then the weighting factor set for realizing the beam pattern shown in FIG. 11 is selected. Of course, other parameters may be considered when selecting the weighting factor set.

Upon setting appropriate weighting factors, the process terminates in step S1014.

In the second embodiment, the directions of arrival of multiple paths in each received signal are estimated, while identifying the source of the incoming wave, and weighting factors for signal transmission are calculated based on the estimation result. Accordingly, signals can be transmitted to a desired destination with fewer interfering waves.

Since the appropriate weighting factor set is selected according to the angle spread, delay time, or other parameters, signals can be transmitted using an appropriate beam pattern according to the communication environment or the channel conditions.

By calculating the appropriate weighting factor set based on the angle spread of multiple paths, efficient signal transmission to a desired destination is realized, and at the same time, power consumption at the wireless base station can be reduced. The reduction of power consumption can lead to increased coverage and link capacity.

With the wireless communication receiver or apparatus of the above-described embodiments, an array antenna can produce an efficient beam pattern capable of reducing interfering waves even in an asymmetric wireless communication environment (with asymmetric traffic characteristic between uplink and downlink).

This patent application is based on and claims the benefit of the earlier filing date of Japanese Patent Application No. 2003-317465 filed Sep. 9, 2003, the entire contents of which are hereby incorporated by reference.

What is claimed is:

1. A wireless communication apparatus, comprising:
    an array antenna configured to receive a signal at a plurality of antenna elements;
    a DoA estimation unit configured to estimate directions of arrival of multiple paths contained in the received signal;
    an angle spread estimation unit configured to estimate an angle spread of the multiple paths;
    a first weighting calculation unit configured to estimate a common set of weighting factors in common for all the paths;
    a second weighting calculation unit configured to estimate an individual set of weighting factors for each of the multiple paths based on the estimated directions of arrival of the paths;
    a weighting unit configured to weight the received signal by multiplying the received signal by the common set of weighting factors or the individual set of weighting factor;
    a demodulator configured to demodulate the weighted signal;
    a DoA information storing unit configured to store information about the angle spread and the directions of arrival of multiple paths of the received signal;
    a third weighting calculation unit configured to calculate a set of transmit weighing factors for defining a beam pattern of a signal to be transmitted; and
    a second weighting unit configured to weight the transmit signal by multiplying the transmit signal by the set of transmit weighting factors.

2. The wireless communication apparatus of claim 1, further comprising:
    a determination unit configured to determine whether the estimated angle spread exceeds a threshold;
    wherein the weighting unit selects one of the common set of weighting factors and the individual set of weighting factors based on the determination result.

3. The wireless communication apparatus of claim 1, wherein the array antenna produces a beam pattern with a main lobe toward an averaged direction of the multiple paths using the common set of weighting factors calculated by the first weighting estimation unit when the angle spread resides in a prescribed range.

4. The wireless communication apparatus of claim 1, wherein the DoA estimation unit identifies the source of the received signal.

5. The wireless communication apparatus of claim 1, wherein the third weighting calculation unit calculates the set of transmit weighting factors so as to realize one of a beam pattern with a main lobe toward a single path selected from the multiple paths, a beam pattern with a main lobe toward each of the multiple paths, and a beam pattern with a main lobe toward an averaged direction of arrival of the multiple paths, based on the DoA information stored in the DoA information storing unit.

6. The wireless communication apparatus of claim 1, further comprising:
    a determination unit configured to determine whether the estimated angle spread exceeds a threshold;
    wherein when the estimated angle spread exceeds the threshold, the third weighting calculation unit calculates the set of weighting factors so as to realize a beam pattern with a main lobe toward each of the multiple paths.

7. The wireless communication apparatus of claim 1, further comprising:
    a determination unit configured to determine whether the estimated angle spread exceeds a threshold;
    wherein when the estimated angle spread does not exceed the threshold, the third weighting calculation unit calculates the set of weighting factors so as to realize a beam pattern with a main lobe toward a direction of a single path selected from the multiple paths.

8. The wireless communication apparatus of claim 1, wherein the angle spread estimation unit estimates the angle spread based on either a statistical variance of the directions of arrival of the paths or an angle difference determined from those paths satisfying a prescribed range of receiving power.

9. A wireless communication method, comprising:
    receiving a signal at multiple antenna elements;
    estimating directions of arrival of multiple paths contained in the received signal;
    estimating angle spread of the multiple paths;
    determining whether the estimated angle spread exceeds a threshold;
    weighting the received signal using one of a common set of weighting factors in common for all the paths and an individual set of weighting factors calculated for each of the paths, based on the determination result;
    demodulating the weighted signal;
    storing the angle spread and the directions of arrival of the multiple paths as DoA information; and
    calculating a set of transmit weighting factors for defining a beam pattern used to transmit a signal based on the DoA information.

10. The method of claim 9, further comprising the step of:

producing a beam pattern with a main lobe toward each of the multiple paths when the angle spread exceeds the threshold.

11. The method of claim 9, further comprising the step of:

producing a beam pattern with a main lobe toward a direction of a single path selected from the multiple paths when the angle spread does not exceeds the threshold.

12. A wireless communication apparatus comprising:

an array antenna configured to receive a signal at a plurality of antenna elements;

a DoA estimation unit configured to estimate directions of arrival of multiple paths contained in the received signal;

an angle spread estimation unit configured to estimate an angle spread of the multiple paths;

a first weighting calculation unit configured to estimate a common set of weighting factors in common for all the paths;

a second weighting calculation unit configured to estimate an individual set of weighting factors for each of the multiple paths based on the estimated directions of arrival of the paths;

a weighting unit configured to weight the received signal by multiplying the received signal by the common set of weighting factors or the individual set of weighting factor;

a demodulator configured to demodulate the weighted signal; and a third weighting calculation unit configured to calculate a set of transmit weighting factors so as to realize a beam pattern with a main lobe toward a single path selected from the multiple paths, a beam pattern with a main lobe toward each of the multiple paths, or a beam pattern with a main lobe toward an averaged direction of arrival of the multiple paths, based on the estimation results of the DoA estimation unit and the angle spread estimation unit.

\* \* \* \* \*